(12) United States Patent
Pinkovezky et al.

(10) Patent No.: US 10,467,708 B2
(45) Date of Patent: Nov. 5, 2019

(54) DETERMINING AN OMITTED COMPANY PAGE BASED ON A CONNECTION DENSITY VALUE

(71) Applicant: Microsoft Technology Licensing, LLC, Redmond, WA (US)

(72) Inventors: Aviad Pinkovezky, Los Altos, CA (US); Huining Feng, Cupertino, CA (US); Viman Deb, San Jose, CA (US); George Benjamin Martin, Shelby, NC (US); Jingjing Huang, Santa Clara, CA (US); Michael Brentley Dimapilis, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 15/146,344

(22) Filed: May 4, 2016

(65) Prior Publication Data

US 2016/0350877 A1    Dec. 1, 2016

Related U.S. Application Data

(63) Continuation of application No. 14/788,705, filed on Jun. 30, 2015, now abandoned.
(Continued)

(51) Int. Cl.
*G06Q 50/00* (2012.01)
*H04L 29/08* (2006.01)

(52) U.S. Cl.
CPC ............ *G06Q 50/01* (2013.01); *H04L 67/02* (2013.01)

(58) Field of Classification Search
USPC ........................................................ 705/319
See application file for complete search history.

(56) References Cited

U.S. PATENT DOCUMENTS

| 8,849,812 B1 | 9/2014 | Mukherjee et al. |
| 2006/0129452 A1* | 6/2006 | Nordberg ............... G06Q 10/10 705/14.46 |

(Continued)

OTHER PUBLICATIONS

"U.S. Appl. No. 14/754,349, Examiner Interview Summary dated Jun. 13, 2017", 16 pgs.
(Continued)

*Primary Examiner* — Gabrielle A McCormick
(74) *Attorney, Agent, or Firm* — Schwegman Lundberg & Woessner, P.A.

(57) ABSTRACT

Techniques to determine that an employer of a member has an omitted company page in a social network are described. A user input can be received from the member. The user input selecting a company from a company list. The company can have a similar name to an employer of the member and the company already having a company page. Member data of the member having social graph information can be accessed. Using the social graph information, a first connection density value for the member and the company can be calculated. Additionally, a second connection density value can be calculated for the member and the employer. Furthermore, a determination that the employer has an omitted company page can be determined based on the first connection density value and the second connection density value. Subsequently, a generation of a company page for the employer can be initiated based on the determination.

14 Claims, 8 Drawing Sheets

Related U.S. Application Data

(60) Provisional application No. 62/169,492, filed on Jun. 1, 2015.

(56) References Cited

U.S. PATENT DOCUMENTS

| | | |
|---|---|---|
| 2007/0218900 A1 | 9/2007 | Abhyanker |
| 2008/0097994 A1 | 4/2008 | Teramoto et al. |
| 2008/0140650 A1 | 6/2008 | Stackpole |
| 2008/0162580 A1 | 7/2008 | Ben Harush |
| 2009/0049010 A1 | 2/2009 | Bodapati |
| 2010/0070875 A1 | 3/2010 | Turski et al. |
| 2010/0268705 A1 | 10/2010 | Douglas et al. |
| 2012/0084280 A1 | 4/2012 | Bouzas et al. |
| 2012/0109837 A1 | 5/2012 | Sahagun et al. |
| 2012/0239494 A1 | 9/2012 | Hu et al. |
| 2013/0151606 A1 | 6/2013 | Piepgrass et al. |
| 2013/0160089 A1* | 6/2013 | Stibel .............. G06Q 10/10 726/4 |
| 2013/0268373 A1 | 10/2013 | Grishaver |
| 2014/0089400 A1 | 3/2014 | Yan et al. |
| 2014/0089780 A1 | 3/2014 | Garcia-Martinez et al. |
| 2014/0237062 A1* | 8/2014 | Abhyanker .......... H04W 4/21 709/206 |
| 2014/0379741 A1* | 12/2014 | Lai .................. G06Q 50/01 707/758 |
| 2015/0067777 A1 | 3/2015 | Heise |
| 2016/0132832 A1 | 5/2016 | Pinkovezky et al. |
| 2016/0350875 A1 | 12/2016 | Deb et al. |

OTHER PUBLICATIONS

"U.S. Appl. No. 14/754,349, Response filed Jun. 12, 2017 to Non Final Office Action dated Apr. 5, 2017", 13 pgs.

"U.S. Appl. No. 14/602,120, Non Final Office Action dated Oct. 3, 2017" 14 pgs.

"U.S. Appl. No. 14/754,349, Examiner Interview Summary dated Nov. 17, 2017", 3 pgs.

"U.S. Appl. No. 14/754,349, Response filed Jan. 7, 2016 to Non-Final Office Action dated Oct. 7, 2015", 18 pgs.

"U.S. Appl. No. 14/788,705, Examiner Interview Summary dated Dec. 1, 2015", 3 pgs.

"U.S. Appl. No. 14/788,705, Final Office Action dated Dec. 4, 2015", 13 pgs.

"U.S. Appl. No. 14/788,705, Non Final Office Action dated Aug. 20, 2015", 12 pgs.

"U.S. Appl. No. 14/788,705, Response filed Nov. 20, 2015 to Non Final Office Action dated Aug. 20, 2015", 13 pgs.

"U.S. Appl. No. 14/754,349, Non Final OFfice Action dated Oct. 7, 2015", 16 pgs.

"U.S. Appl. No. 14/754,349, Final Office Action dated Jul. 20, 2016", 19 pgs.

"U.S. Appl. No. 14/754,349, Non Final Office Action dated Apr. 5, 2017", 20 pgs.

"U.S. Appl. No. 14/754,349, Response filed Dec. 20, 2016 to Final Office Action dated Jul. 20, 2016", 14 pgs.

House, Martin, "SNA—Why Visually Analyse?", Martin House Consulting, [Online]. Retrieved from the Internet: <URL: http://web.archive.org/web/20121212033117/http://martinhouseconsulting.wordpress.com/social-network-analysis-sna/sna-whyvisually-analyse-information/, (2013), 5 pgs.

"U.S. Appl. No. 14/754,349, Final Office Action dated Sep. 7, 2017", 17 pgs.

"Applicant Initiated Interview Summary in U.S. Appl. No. 14/602,120", dated Dec. 11, 2017, 3 Pages.

"Final Office Action Issued in U.S. Appl. No. 14/602,120", dated Apr. 6, 2018, 17 Pages.

"Non Final Office Action Issued in U.S. Appl. No. 14/602,120", dated Oct. 1, 2018, 17 Pages.

"Response to Final Office Action filed in U.S. Appl. No. 14/602,120", filed Aug. 3, 2018.

"Response to Non Final Office Action filed in U.S Appl. No. 14/602,120", filed Dec. 19, 2017, 20 Pages.

"Applicant Initiated Interview Summary in U.S. Appl. No. 14/754,349", dated Jul. 11, 2018, 3 Pages.

"Non Final Office Action Issued in U.S. Appl. No. 14/754,349", dated Feb. 28, 2018, 16 Pages.

"Response to Final Office Action filed in U.S. Appl. No. 14/754,349", filed Dec. 5, 2017, 17 Pages.

"Response to Non Final Office Action filed in U.S. Appl. No. 14/754,349", filed Jul. 11, 2018, 12 Pages.

"Applicant Initiated Interview Summary Issued in U.S. Appl. No. 14/602,120", dated Dec. 3, 2018, 3 Pages.

"Final Office Action Issued in U.S. Appl. No. 14/602,120", dated Mar. 26, 2019, 11 Pages.

"Final Office Action Issued in U.S. Appl. No. 14/754,349", dated Nov. 6, 2018, 16 Pages.

"Notice of Allowance Issued in U.S. Appl. No. 14/754,349", dated Mar. 20, 2019, 10 Pages.

U.S. Appl. No. 14/602,120, filed Jan. 21, 2015, Generating Company Profiles Based on Member Data.

U.S. Appl. No. 14/754,349, filed Jun. 29, 2015, Automatic Initiation for Generating a Company Profile.

U.S. Appl. No. 14/788,705, filed Jun. 30, 2015, Automatic Generation of Company Profiles.

\* cited by examiner

FIG. 7

DETERMINING AN OMITTED COMPANY PAGE BASED ON A CONNECTION DENSITY VALUE

CROSS-REFERENCE TO RELATED APPLICATIONS

This application is a continuation of U.S. application Ser. No. 14/788,705 filed Jun. 30, 2015, which claims priority to U.S. Provisional Application No. 62/169,492 filed Jun. 1, 2015, which applications are incorporated in their entirety herein by reference.

TECHNICAL FIELD

The subject matter disclosed herein generally relates data processing member data to determine an omitted company page, and subsequently generating a company profile for the omitted company page. Specifically, the omitted company page can be determined based on a connection density value that is derived by processing of the member data.

BACKGROUND

A social networking website can maintain information on members, companies, organizations, employees, and employers. The social networking website may also include a directory of company profiles (e.g., company pages), which can include company information about a specific company.

In some instances, the social networking website can generate a company page for a company based on a request from an employee of a company to generate the company page. The company page can include company information about the company. The company information can include a headquarters location of the company, other office locations, a hierarchical structure of the company (such as identifying a subsidiary), and the like. Often, some useful company information may be missing or otherwise unavailable for companies without a company page.

BRIEF DESCRIPTION OF THE DRAWINGS

Some embodiments are illustrated by way of example and not limitation in the figures of the accompanying drawings.

FIG. 7 is a user interface diagram illustrating an example of a company page presenting information about a company, according to some example embodiments.

DETAILED DESCRIPTION

Figure 1:
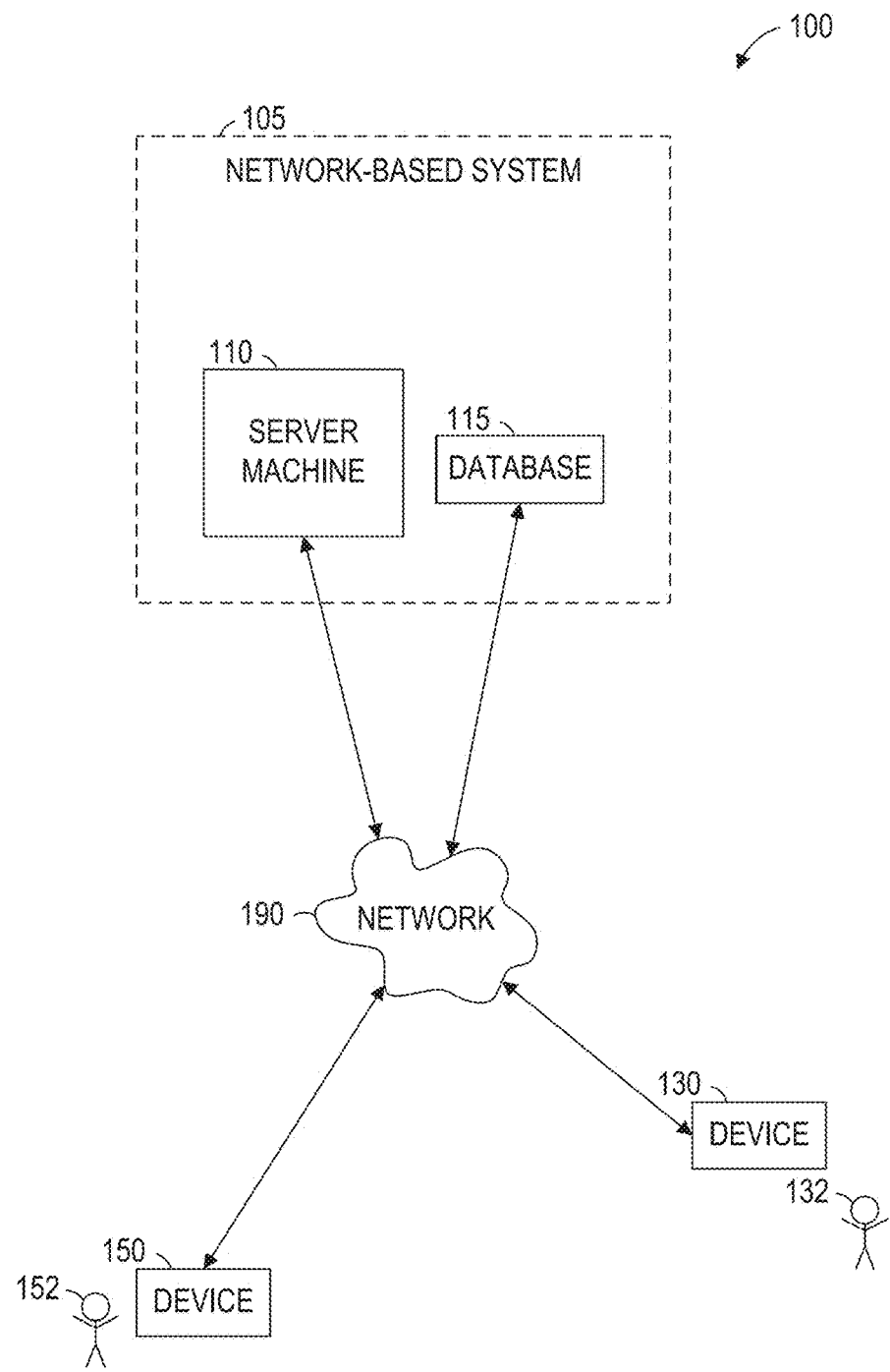
FIG. 1 is a network diagram illustrating a network environment suitable for a social network, according to some example embodiments.

A member of a social network can create a member profile page. For example, the profile page of a member can include a location, an employer, and an industry associated with the member. In addition to member profiles, a social network can have company pages of a company (e.g., organization) with company information relating to the company. The company information can include associated members (e.g., employees), office locations, and number of employees. In some instances, the social network may have an omitted company page. The omitted company page can be a company page for a valid company that has yet to be created in the social network. For example, an omitted company page may be a missing company page for a company in the social network.

Techniques described herein allow for the automatic generation of an omitted company page for a valid company based on a user input from a member. In some instances, the user input can be an indication that a company is the employer of the member, such as the member selecting a company name for a pull-down list of company names. Based on the selection, the member can include a company in the member's profile page as the employer of the member.

A company page can include a name of the company, associated members, office locations of the company, a company logo, a company description, a company's industry, and a website of the company. The profile pages of the associated members can be mapped (e.g., linked) to the company page.

However, the social network may have omitted a company page. For example, an omitted company may have employees as members of the social network that list the company as their employer, but the omitted company may lack a company page on the social network.

By using the information accessed from the member profiles associated with a valid company, a company page generation module can generate a company profile with company information for the valid company.

Additionally, the user input from the member of the social network can initiate (e.g., trigger) the process of automatically generating a company profile (e.g., company page). The user input can be an input indicative of an employer of the member. An example of the user input can include the member selecting a company from the presented list of company names.

Furthermore, using social graph information in the social network, embodiments of the present disclosure can determine that the employer of the member does not have a company page in the social network. The social graph information can include connection density information associated with the member. For example, the member can select XYZ Corporation (e.g., first XYZ Corporation) as the employer; however, based on the connection density value being below a threshold value, the system can determine that there are multiple XYZ Corporations, and the actual employer (e.g., second XYZ Corporation) of the member does not have a company page in the social network. For example, the connection density value can be below the threshold value when the member does not have any connections to other employees of the first XYZ Corporation.

Once the system determines that the employer does not have a company page in the social network, the system can begin obtaining company information. Company information can include, but is not limited to, age of company, size of company, ownership of company, partnership between different companies, geographic locations (e.g., distribution center, headquarters), market, position, stage, trends, customers, property, parent company, and subsidiaries of a company.

Moreover, company information can be a set of characteristics associated with the company. Company information can be specialized to companies in a particular industry and can allow for comparison of companies in a similar industry.

Techniques described herein can automatically initiate the creation of a company profile for a valid company without a profile on the social network. Additionally, the company can be validated and verified based on member data (e.g., connection density value). Furthermore, the creation of a company page can be triggered based on a member selecting an employer, and a determination that the employer does not have a company page in the social network.

According to some embodiments, a company profile can be created based on company information obtained from a business registry website, such as the California Secretary of State's website. Additionally, a third-party site can include, but not limited to, a website maintained by the company. Additionally, company information can be determined from member profile data. For example, a member profile can include the name of the member's employer and the member's location, but the employer may not have created a company profile on the social network.

The company information can be determined based on information accessed from member profiles. The company information can include company name, company locations, website associated with the company, country associated with the company, region associated with the company, industry associated with the company, ZIP code associated with the company, and number of members.

As previously mentioned, connection density information can be used to determine if a company does not have a company page in the social network. Connection density information can be based on the connections first-degree, second-degree) between different members.

In another example, the generated company profile page can be accessible to the public after an automated validation, de-duplication, and enrichment process based on the member data. In yet another example, the generated company profile page is verified (e.g., validated and de-duplicated) and enriched using crowdsourcing techniques.

Example methods and systems are directed to techniques for determining company information based on member profile data and social graph data. More specifically, the present disclosure relates to methods, systems, and computer program products for generating a company profile page for a company without a profile page on the social network. Techniques for determining a valid company based on the social network of the company's employees are described herein.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for a social network service, according to some example embodiments. The network environment 100 includes a server machine 110, a database 115, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store member data (e.g., profile data, social graph data) for the social network service. The server machine 110, the first device 130, and the second device 150 may each be implemented in a computer system, in whole or in part, as described below with respect to FIG. 8.

Also shown in FIG. 1 are the users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below in FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
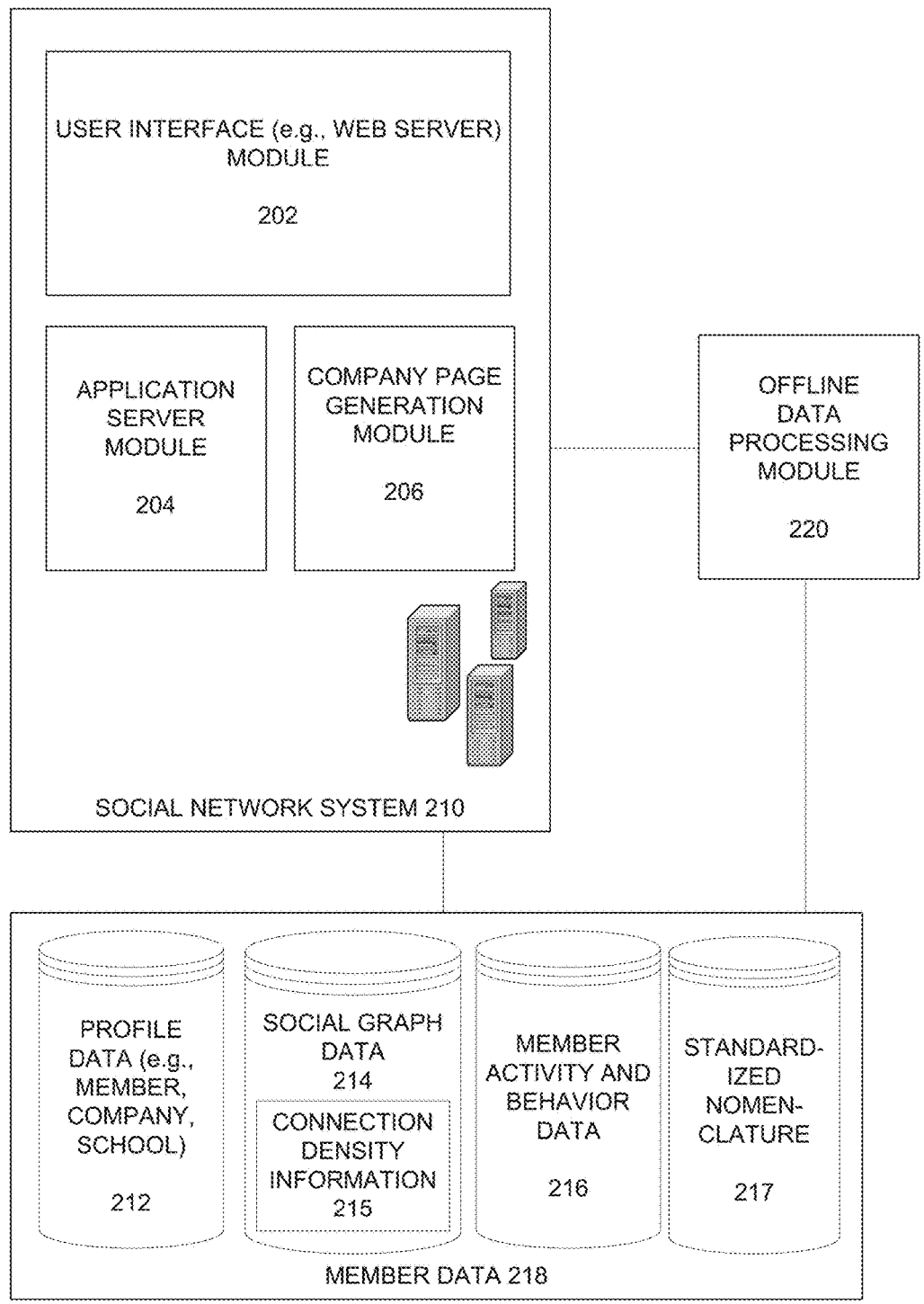
FIG. 2 a block diagram illustrating various modules of a social network service, according to some example embodiments.

FIG. 2 is a block diagram illustrating components of a social network system 210, according to some example embodiments. The social network system 210 is an example of a network-based system 105 of FIG. 1. The social network system 210 can include a user interface module 202, an application server module 204, and a company page generation module 206, all configured to communicate with each other (e.g., via a bus, shared memory, or a switch).

Additionally, the social network system 210 can communicate with the database 115 of FIG. 1, such as a database storing member data 218. The member data 218 can include profile data 212, social graph data 214, member activity and behavior data 216, and standardized nomenclature 217. Using the member data 218, a valid company with an omitted company profile can be determined. In some instances, connection density information 15 derived from the social graph data 214 can determine if a company has an omitted company page.

The connection density value can be a factor in determining an omitted company page for a company. For members belonging to the company, the company page generation module 206 can determine how densely a member is connected to another member. The connection density value can be calculated for all the member profiles associated with the company, or for a subgroup of the member profiles associated with the entity. Subgroups can be based on suggested locations, company functions, years of experience of a member, departments within the company, or a title (e.g., director, vice-president) of a member. Company functions can include member profiles associated with a specific function (e.g., human resource department, research and development, leadership team within the company.

By having a minimum threshold for the connection density value, the company page generation module 206 can more accurately determine whether an employer has an omitted company page. When the minimum threshold is surpassed, the company page generation module 206 can present a confidence score associated with the likelihood that the employer has a company page. Alternatively, the company page generation module 206 can present a binary result (e.g., Yes, No) based on the connection density value.

For example, when an employer has n=10 employees, there are 45 ($45=\Sigma_{k=1}^{n}k-1=9+8+7+6+5+4+3+2+1$) unique first-degree connections. Therefore, when the minimum threshold for the connection density value is preset at 20%, then there should be at least 9 connections (9=45*20%) for the company page generation module 206 to determine with a high-confidence level (e.g., 95% confidence level) that the duplicate company profile is associated with the employer of the specific member.

The standardized nomenclature 217 can include a database of standardized industry type for a company, standardized job titles for employees of the company, and standardized job functions for employees of the company. Additionally, the standardized job titles and job functions can be based on the industry of the company. Furthermore, the standardized nomenclature 217 can map raw location strings to standardized cities, states, countries, and postal codes.

Furthermore, the company page generation module 206 can be configured to process data offline or periodically using an offline data processing module 220. For example, the offline data processing module 220 can include Hadoop servers that access the member data 218 periodically (e.g., on a nightly basis) to determine if there is an omitted company page. Processing the member data 218, such as deriving the connection density value, may be computationally intensive; therefore, due to hardware limitations and to ensure reliable performance of the social network, the determination of an omitted company page may be done offline.

As will be further described with respect to FIGS. 3-6, the company page generation module 206 in conjunction with the user interface module 202 and the application server module 204 can automatically generate a company page for a company.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As shown in FIG. 2, database 115 can include several databases for member data 218. The member data 218 includes a database for storing the profile data 212, including both member profile data and profile data for various companies. Additionally, the member data 218 can store the social graph data 214 and the member activity and behavior data 216.

In some embodiments, the member data 218 may be processed (e.g., real-time, background/offline) using the company page generation module 206 to determine whether a company has an omitted company profile on the social network system 210. For example, if a member has provided information about various jobs the member has held with the same or different companies, and the physical location of those companies, this information can be used to determine an omitted company profile. Additionally, connection density information 215 and connection density value can be used to determine if multiple companies have the same name.

The profile data 212 can be used to determine companies (e.g., organizations, institutions) associated with a member. For instance, with many social network services, when a user registers to become a member, the member is prompted to provide a variety of personal and employment information that may be displayed in the member's personal web page. Such information is commonly referred to as profile data 212. Using the information received from the member, the company page generation module 206 can trigger the automatic generation of a company page for a company. For example, if the profile data 212 includes a location associated with the member, and company pages with the same company name as the employer do not list this location as an office location, then the employer has a higher likelihood of having an omitted company page.

The profile data 212 that is commonly requested and displayed as part of a member's profile includes the member's age, birthdate, gender, interests, contact information, residential address, home town and/or state, spouse and/or family members, educational background (e.g., schools, majors, matriculation and/or graduation dates, etc.), employment history, office location, skills, professional organizations, and so on. In some embodiments, the profile data 212 may include the various skills that each member has indicated he or she possesses. Additionally, the profile data 212 may include skills for which a member has been endorsed.

For example, if the profile data 212 includes a location associated with the member, and company pages with the same company name as the employer do not list this location as an office location, then the employer has a higher likelihood of having an omitted company page.

With certain social network services, such as some business or professional network services, the profile data 212 may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Additionally, social network services provide their users with a mechanism for defining their relationships with other people. This digital representation of real-world relationships is frequently referred to as a social graph. As will be described later, the connection density information 215 derived from the social graph data 214 can be used to determine an omitted company page.

In some instances, the social graph data 214 can be based on a member's presence within the social network service. For example, consistent with some embodiments, a social graph is implemented with a specialized graph data structure in which various members are represented as nodes connected by edges. The social graph data can be used by the company page generation module 206 to determine the likelihood that a company with a company page is the valid employer of the member. For example, multiple companies may have the same company name, but only a subset of those companies may have a company page. Therefore, a company having an omitted company page can be determined based on the connection density information 215 of the member.

In addition to hosting a vast amount of social graph data 214, many social network services maintain member activity and behavior data 216.

In some instances, the member activity and behavior data 216 can determine whether the employer has an omitted company page. The member activity and behavior data 216 can include profile page views, company page views, newsfeed postings, and clicking on links on the social network system 210.

For example, when the member activity and behavior data 216 includes page views of company pages in the same industry as the employer, and the company pages with the same name of the employer do not include this specific industry, then the employer has a higher likelihood of having an omitted company page. Additionally, if the member activity and behavior data 216 does not include page views of other company pages with the same company name as the employer, then the employer has a higher likelihood of having an omitted company page.

Figure 3:
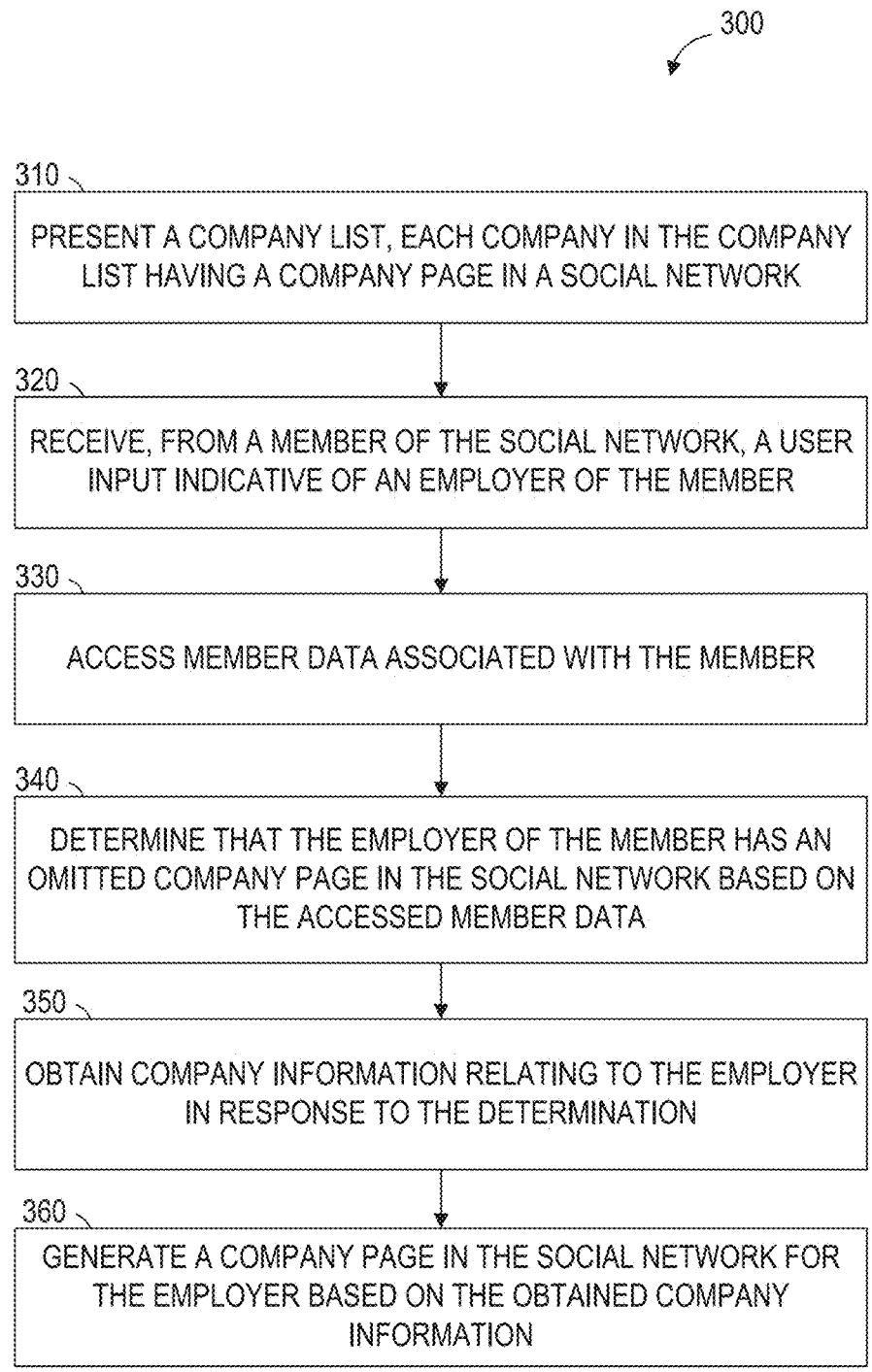
FIG. 3 is a flowchart illustrating a method for generating a company page for an employer with an omitted company page, according to some example embodiments.

FIG. 3 is a flowchart illustrating operations of the company page generation module 206 in performing a method 300 for initiating and generating a company page for an employer with an omitted company page, according to some example embodiments. Operations in the method 300 may be performed by the network-based system 105, using modules described above with respect to FIG. 2, As shown in FIG. 3, the method 300 includes operations 310, 320, 330, 340, 350, and 360.

At operation 310, the user interface module 202 can present a company list to a member in the social network system 210. Additionally, each company in the list of companies can have a company page in the social network system 210. The list of companies with company pages can be accessed from the database 115 (e.g., profile data 212) using the network 190.

In some instances, when a user registers to become a member, the member is prompted to provide a variety of employment information that may be displayed in the member's profile page. Such information is commonly referred to as profile data 212. Using the information received from the member, the company page generation module 216 can trigger the automatic generation of a company page for an employer with an omitted company page.

For example, when requesting an employer's name from a member in the social network system 210, the user interface module 202 can present, to the member, a company list (e.g., pull-down list of company names). The company list can be generated based on current company pages in the social network system 210.

Additionally, the company page generation module 206 can access the profile data 212 of a member profile to tailor (e.g., filter) the company list presented to the member. As previously mentioned, the profile data 212 includes a person's education, the company at which a person was previously employed, the location of the member, an industry in which a person is employed, a job title or function, an employment history, skills possessed by a person, and professional organizations of which a person is a member. For example, the company list can be pre-filtered based on information derived from the member data 218, such as only including software companies if the member is a software developer. Additionally, the list can be tailored based on industry, location, job function, or user input.

At operation 320, the user interface module 202 can receive, from the member, a user input indicative of an employer of the member. For example, the member can select a company from the company list. The selected company can have the same name as the employer of the member. Alternatively, a user input can include the member entering (e.g., typing-in) one or more e.g., the first and second) letters of the company name. In this instance, the company list can be further tailored based on the user input until the member selects a company.

In some instances, the user input is a selection of a company from the company list, where the company has a similar name to the employer. In this instance, the determination, later discussed at operation 340, can determine that the company page corresponding to the selected company is not related to the employer. For example, the user may select a company name from the company list that is a similar, name to the employer, but is not the employer. The company page generation module 206 can determine that the selected company is not the employer based on the connection density information 215, the industry, the location, and so on.

At operation 330, the company page generation module 206 can access member data 218 associated with the member. The member data 218 can include social graph data 214. In some instances, the company page generation module 206 can derive connection density information 215 based on the accessed social graph data 214. As previously mentioned, the connection density information 215 may be derived and processed b the offline data processing module 220.

At operation 340, company page generation module 206 can determine that the employer of the member has an omitted company page based on the accessed member data 18. In some instances, the company page generation module 206 can access the social graph data 214 to verify that a member is connected to other employees associated with the employer. The social graph data 214 can include the connection density information 215.

Using the connection density information 215 and connection density value, the company page generation module 206 may determine an omitted company page automatically (e.g., without manual human labor), such as analyzing filings from a government database where employers may be registered, such as a city's secretary of commerce database to determine if there are multiple companies with the same name.

The predetermined threshold for the connection density value can be dependent on the number of employees. In some instances, a higher connection density value threshold may be used for a smaller company, while a lower connection density value threshold can be used for a larger company. For example, it is less likely that an employee knows each and every employee when the employer is a large company (e.g., 10,000+).

The connection density value can be calculated for the whole company, or subset of the company based on an attribute associated with the member (e.g., specific department or office location). The connection density value can verify with high certainty if an employer has an omitted company page.

For example, if the connection density value is below the minimum threshold, then the company page generation module 206 determines that the employer has an omitted (e.g., is lacking) a company page, and therefore initiates the automatic generation of a company page for the employer.

Additionally, the employees of a company with a company page may be well connected if the connection density is above a threshold value, which would imply that the member is an actual employee. Accordingly, when a minimum confidence level is not met, the company page generation module 206 may infer that the employees do not know each other, and the relationship between the company and member may not be authenticated. Therefore, the company having a company page may not be the same company as the employer of the member.

In some instances, when a connection density value based on the connection density information 215 is below a predetermined threshold, then it can be determined that the employer has an omitted company page. The connection density value can be based on the connection of the member with to other members associated with the company having the company page. For example, when the connection density value is low, there is a higher likelihood that the member does not know other employees of the company, and therefore does not work for the company. This can be the case when multiple companies have the same company name.

Moreover, the determination that the employer has an omitted company page can be based on location and on behavior indicators from the member activity and behavior data 216.

In some instances, the company page generation module 206 can access profile data 12 (e.g., data from the company page) of a company having the same name as the employer of the member. The profile data 212 from the company page can include a company name, company uniform resource locator (URL), company location, or industry associated with the company. The location can include country, state, city, region, ZIP code, and street address. Using the profile data 212, the company page generation module 206 can determine the likelihood that the company page is not associated with the employer, and therefore the employer has an omitted company page. For example, when the location of the company and the employer associated with the member are different, it can increase the likelihood that the employer has an omitted company page.

Furthermore, the company page generation module 206 can search for the company pages in the profile data 212 for potential companies corresponding to the employer. The search can be based on different variations of the employer's name, a location of the employer, and an industry of the employer. When a company profile associated with the determined company is not returned during the search, the company page generation module 206 can determine that the employer has an omitted company page (e.g., does not have a company page).

Figure 4:
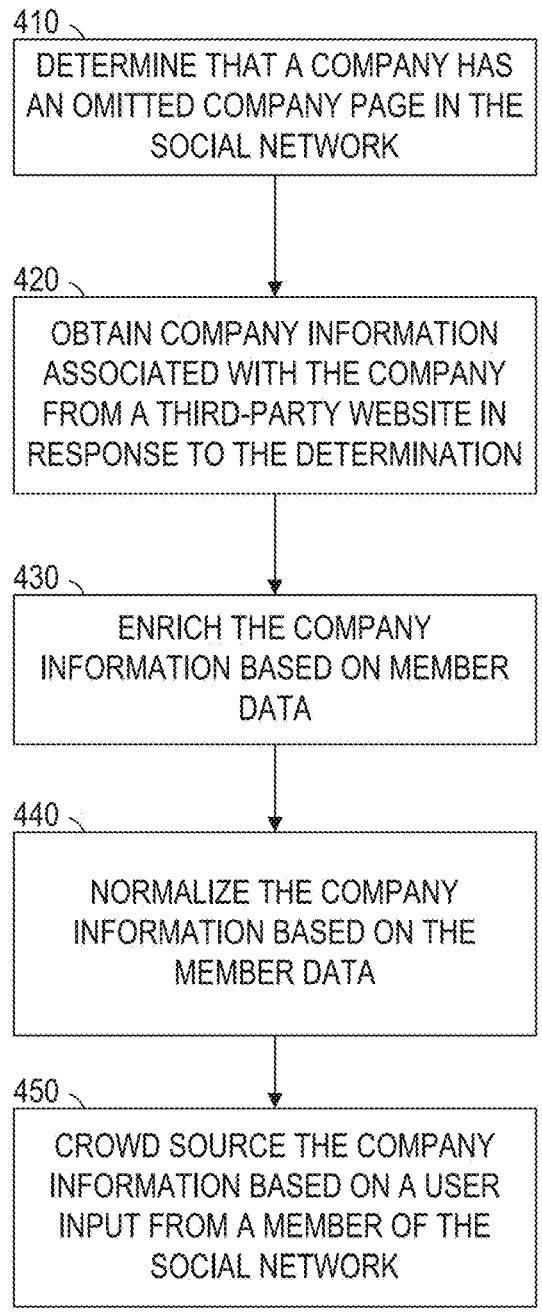
FIG. 4 is a flowchart illustrating a method for obtaining company information and generating a company page, according to some example embodiments.
Figure 5:
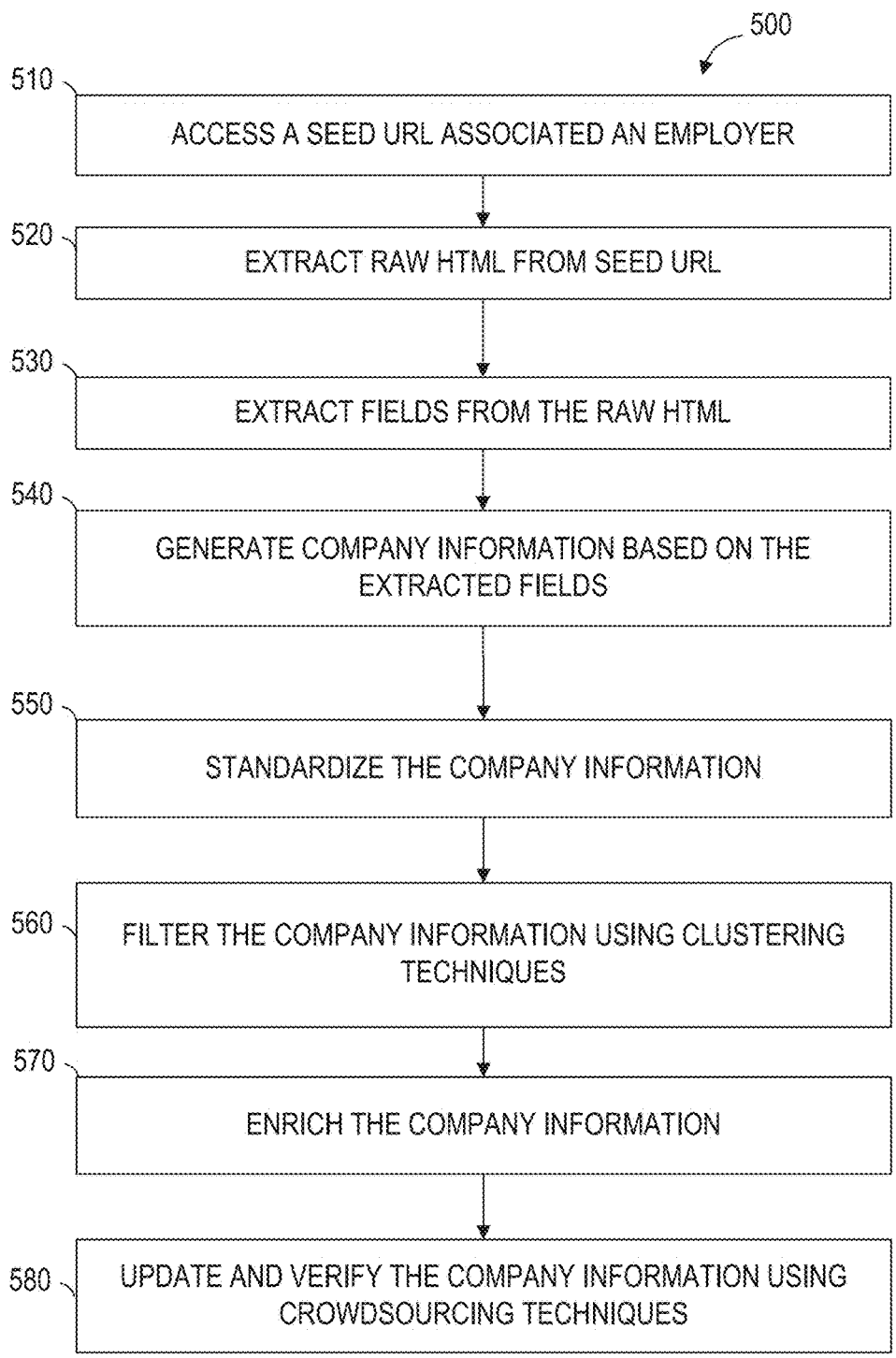
FIG. 5 is a flowchart illustrating a method for obtaining company information, according to some example embodiments.
Figure 6:
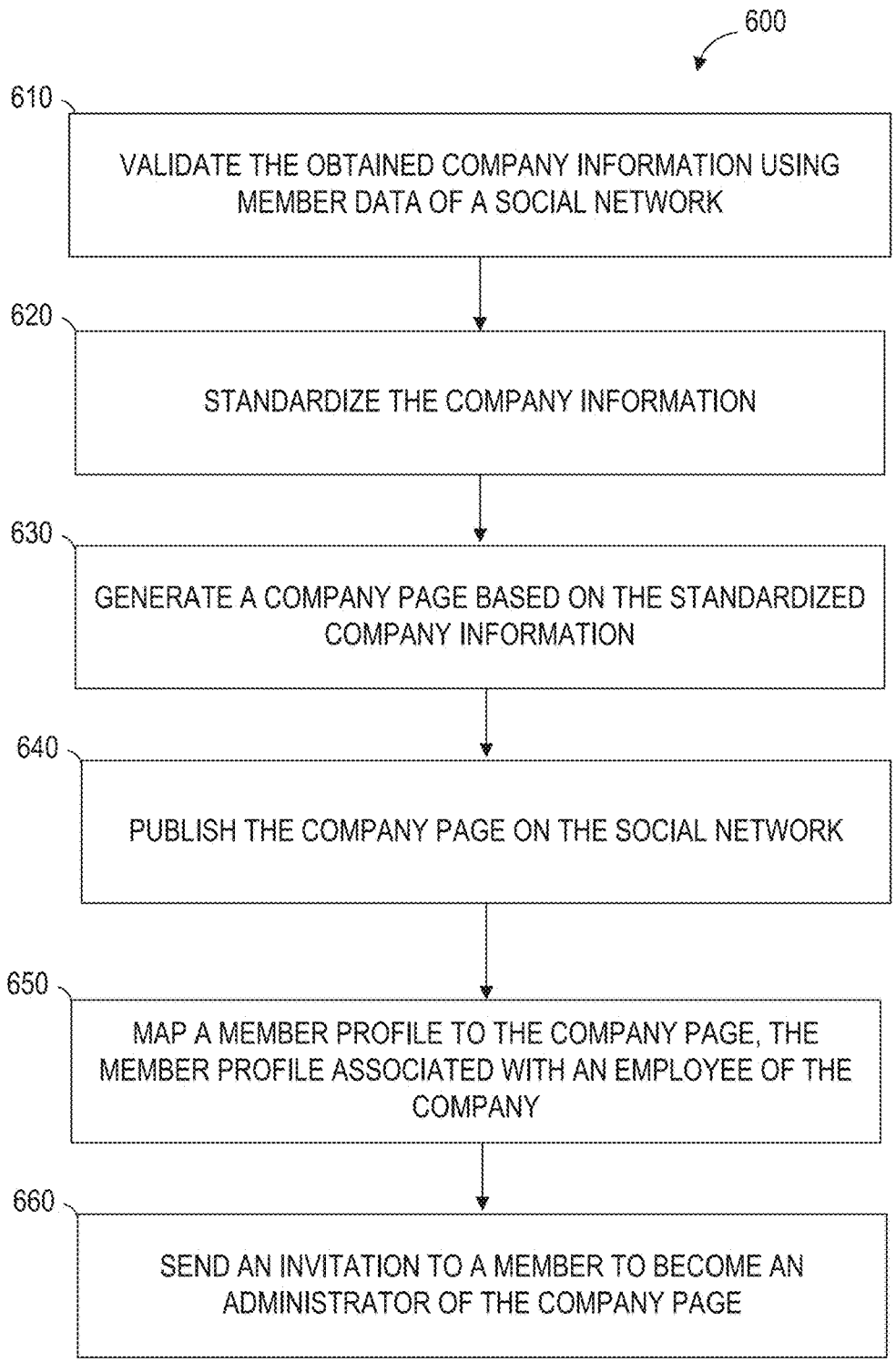
FIG. 6 is a flowchart illustrating a method for publishing a company page, according to some example embodiments.

At operation 350, the company page generation module 206 can obtain company information relating to the employer in response to the determination at operation 340. The company information can be obtained from validated third-party sites. An example of a validated third-party site can include business registry websites or databases maintained by a government entity, such as the California Secretary of State's website. Additionally, the company information can be obtained from a website maintained by the employer. For example, using the URL received from the profile data 212 of the member, the company page generation module 206 can determine the employer's website. Alternatively, using the name of the employer from the profile data 212 of the member can be used as a keyword in a search engine. Based on the search result, a URL corresponding to the company can be determined or inferred. FIGS. 4-6 further describe techniques for obtaining and updating company information in order to generate a company page for the employer.

At operation 360, the company page generation module 206 can generate a company page in the social network system 210 for the employer based on the obtained company information at operation 350. In some instances, the company page can be generated based on member data 218 in the social network. For example, the company page generation module 206 can generate a company page based on information (e.g., profile data 212) accessed from members associated with the employer. FIGS. 4-6 further describe techniques for automatically generating a company page for the employer.

In some instances, method 300 can further include the company page generation module 206 storing the generated company page in the profile data 212. For example, the company page may not be accessible (e.g., exposed to the public until an analyst verifies the company page generated at operation 360.

In some instances, method 300 can further include the company page generation module 206 causing a presentation (e.g., post) of the generated company profile on the social network system 210. In some instances, an analyst can validate the generated company profile page, which results in the generated company profile page being accessible to the public. In other instances, the generated company profile page is validated based on information derived from the member data 218 or crowdsourcing techniques.

FIG. 4 describes techniques for obtaining company information after the determination that the employer has an omitted company page, such as after operation 340 of method 300, according to some embodiments.

FIG. 4 is a flowchart illustrating operations of the company page generation module 206 in performing a method 400 for obtaining company information and generating a company page, in accordance with an embodiment of the present disclosure. Operations in the method 400 may be performed by the network-based system 105, using modules described above with respect to FIG. 2. As shown in FIG. 4, the method 400 includes operations 410, 420, 430, 440, and 450.

At operation 410, the company page generation module 206 can determine that a company has an omitted company page in the social network. For example, operation 340 of method 300 illustrates an example of the company page generation module 206 determining that an employer has an omitted company page. The user interface module 202, application server module 204, and company page generation module 206 in the social network system 210 are configured to communicate with each other (e.g., via a bus, shared memory, or a switch) to determine whether a company has an omitted company page.

At operation 420, the company page generation module 206 can obtain company information associated with the company from a third-party website in response to the determination at operation 410. For example, the company page generation module 206 can ingest information retrieved from other websites. Examples of other websites can include the company's website, a business registry website or database maintained by a government entity, such as California Secretary of State's Office At operation 430, the company page generation module 206 can enrich (e.g., update, improve, enhance) the company information based on member data from the social network system 210. The enrichment process includes adding additional information to the company information or company page based on information derived from the member data 218. In some instances, the enrichment process can occur continuously, even after the company page has been automatically generated. Additionally, the company generation module 206 can enrich the company information by periodically searching third-parties for updated information.

At operation 440, the company page generation module 206 can normalize the company information based on the member data. The member data can include connections associated with an employee of the company. An employee of the company can be a member of the social network system 210 that has the company listed as his or her employer.

Normalization can include de-duplicating multiple potential company pages associated with the same company. The de-duplication can be performed using clustering techniques as known in the art.

Normalization can also include determining a standardized industry for the company, standardized job titles for employees of the company, and standardized job functions for employees of the company. The standardized industry, job title, and job function can be accessed from the standardized nomenclature 217.

In some instances, in order to ensure that two company profiles are not generated for the same company, a potential new company page is de-duplicated (e.g., removed) from the automatic company profile generation process. For example, the company page generation module 206 can determine that determined company A and determined company B may have overlapping members. When the confidence score for a duplicate company is above a threshold, the company page generation module 206 does not generate a company profile for the duplicate company.

In some instances, the company page generation module 205 can de-duplicating a plurality of potential company pages associated with the company. Additionally, the de-duplicating can be based on a confidence score associated with overlapping members linked to the plurality of potential company pages. For example, members in the social network system 210 can be linked to each potential company pages, and based on the overlapping members between the plurality of potential company pages a confidence score can be calculated.

Continuing with the de-duplication example, a first member may be associated with Company A with a 90% confidence level, with Company B with an 89% confidence level, and with Company C with a 40% confidence level. In some instances, the first member can be associated with only one company; therefore, the company page generation module 206 can determine that Company C is not the employer of the first member. However, because the confidence level for Companies A and B is above a predetermined level (e.g., 70%), the company page generation module may now determine if Companies A and B are the same company by using the member data 218. Additionally, company pages can be de-duplicated based on the physical address and name similarity associated with the company pages. If it is validated that Companies A and B are the same company, then a company page is generated for only one of the companies. For example, if Companies A and B have the same website URL, it can be assumed that they are one company, and therefore the company profile may be generated only for Company A because of the higher confidence level associated with Company A.

Additionally, when a company is determined to be a duplicate, the company page generation module 206 can update the method 400 to remove the duplicate company page from the automatic company profile generation process.

At operation 450, the company page generation module 206 can crowd source the company information based on a user input from a member of the social network system 210. For example, the company page generation module 206 can allow members of the social network system 210 to modify the automatically generated company page via user inputs. In some instances, the user inputs are verified by other members of the social network system 210, or an administrator of the social network system 210. The user interface module 202 can receive the user input from the member. The user input can include text description, images, and videos of the company.

FIG. 5 describes another example for obtaining company information after the determination that the employer has an omitted company page, such as after operation 340 of method 300.

FIG. 5 is a flowchart illustrating operations of the company page generation module 206 in performing a method 500, according to some example embodiments. Method 500 can be an example of operation 420 in FIG. 4. Operations in the method 500 may be performed by the network-based system 105, using modules described above with respect to FIG. 2. As shown in FIG. 5, the method 500 includes operations 510, 520, 530, 540, 550, 560, 570, and 580.

In some instances, based on the determination that an employer has an omitted company page, a trigger for the company page generation module 206 to obtain (ingest)

company information of the employer can occur. For example, the company can be the employer of a member of the social network system as described in method 300 in FIG. 3. For example, the ingestion is triggered when the company page generation module 206 determines that the company has an omitted company page, such as after operation 340 of method 300.

At operation 510, the company page generation module 206 can access a seed URL (e.g., company URL) associated with an employer. For example, several tools (e.g., a search engine optimization tool, user input of seed URL, crawling of directories, crawling of search result pages) can be used to discover company URLs in order to ingest jobs listings.

For example, the company URL can have a plurality of URLs. The company page generation module 206, using rules to handle pagination, can ingest each specific URL (e.g., page 1, page 2 . . . and page 10) in order to ingest all of the company information.

At operation 520, raw HTML (Hyper-Text Markup Language) can be extracted from the seed URL. For example, the company page generation module 206 can perform the ingestion by extracting raw HTML from the URL. Additionally, using clustering techniques, the raw HTML can be used in the de-duplication process.

Furthermore, an API from the company page generation module 206 can be used to map raw location strings to standardized cities, states, countries, and postal codes using the standardized nomenclature 217. The raw location strings can be information accessed from a location field in the raw HTML.

At operation 530, the company page generation module 206 can extract fields from the raw HTML. The company page generation module 206 can define rules to extract specific company information based on the industry of the company, the job function of the member, or the location of the company.

In some instances, to ensure high accuracy of the company information on the social network system 210, the information extracted by the company page generation module 206 can be verified using an analyst.

At operation 540, the company page generation module 206 can generate company information on the social network system 210 based on the extracted fields.

At operation 550, the company information can be standardized using the standardized nomenclature 217. For example, the company page generation module 206 may generate company information using known (e.g., standardized) classifiers for job functions, company name; industry, employment type, and seniority. In some instances, the company page generation module 206 can fill in missing features using member data 218.

At operation 560, the company information can be filtered using a spam classifier to remove low quality company information. For example, company information can be validated based on member data 218 in order to ensure high quality company information is listed on the company page of the social network system 210.

Furthermore, at operation 560, the company page generation module 206 can de-duplicate company pages to prevent duplicates from being posted on the social network system 210. The de-duplication can be based on clustering techniques. As previously mentioned, the clustering techniques can filter company information by de-duplicating a company page when two company pages are being generated for the same employer.

At operation 570, the company page generation module 06 can continuously monitor and enrich the company information by periodically updating the information associated with the seed URL. For example, when the seed URL is updated by a third-party, the company information can be updated using method 500.

At operation 580, the company page generation module 206 can update and verify the company information using crowd sourcing techniques. For example, using a verification process and machine learning techniques, the company page generation module 206 can ensure that the company information is being extracted properly.

In some instances, the standardized company information and company pages are indexed to allow the information to be searched. For example, the company page generation module 206 can save all the data in the search index so that the company information can be searchable.

FIG. 6 is a flowchart illustrating operations of the company page generation module 206 in performing a method 600 for validating the company information, according to some example embodiments. Operations in the method 600 may be performed by network-based system 105, using modules described above with respect to FIG. 2.

At operation 610, the company page generation module 206 can validate the obtained company information using member data 218. In some instances, to ensure the accuracy and authenticity of the company information before being posted on the social network system 210, the company page generation module 206 can access member data 218 to determine the validity of the company information. For example, the location, industry, job titles at the company, organization chart of the company, job description, and company expertise can be validated based on the member data 218 associated with the company.

Furthermore, the company page generation module 206 can use member data 218 to determine the validity of the extracted fields from operation 530. For example, the location, title, seniority, and job description can be verified using member data 218 from the same company or job listing data from competitors.

At operation 620, the company page generation module 206 can use the techniques described at operation 550 to standardize the company information before publishing the new company page with the company information. For example, standardizing can include modifying the information to relate to industry norm and nomenclature. Additionally, standardization can include formatting (e.g., font change, indentation, and spacing) the company information to ensure that the generated company page is similar to other company pages in the social network system 210.

Furthermore, the social network system 210 can have a process of standardizing companies. Using a standardized company list, the company page generation module 206 can determine the company associated with the company information. Once the company is determined, the company page generation module 206 can access profile data 21 of the employees of the company to further verify the company information.

At operation 630, the company page generation module 206 can generate a company page based on the company information. The company page generation module 206 can use the techniques described at operation 360 and 540 to generate the company page.

At operation 640, the company page generation module 206 can publish the generated company page in the social network system 210. In some instances, the publishing at operation 640 can include filling in missing field attributes in the generated company page.

At operation 650, the accessed member data 218 can include social graph data 214, which can include the connections of the employees associated with the company page. When an employee is not linked to the company page, the company page generation module 206 can automatically link the employee to the company page.

At operation 660, the accessed member data 218 can include member activity and behavior data 216 to determine an administrator for the company page. The member activity and behavior data 216 can include the page views of the company page, page views of similar companies, and page views of job listings for the company In some instances, the company page generation module 206 can send an invitation to a member of the social network to become an administrator of the newly generated company page.

In some instances, rule creation and rule verification can allow for code-free ingestion of the company information by the company page generation module 206. Rule creation allows an analyst to process a dump of raw HTML (e.g., from operation 520) for ingestion.

Figure 7:
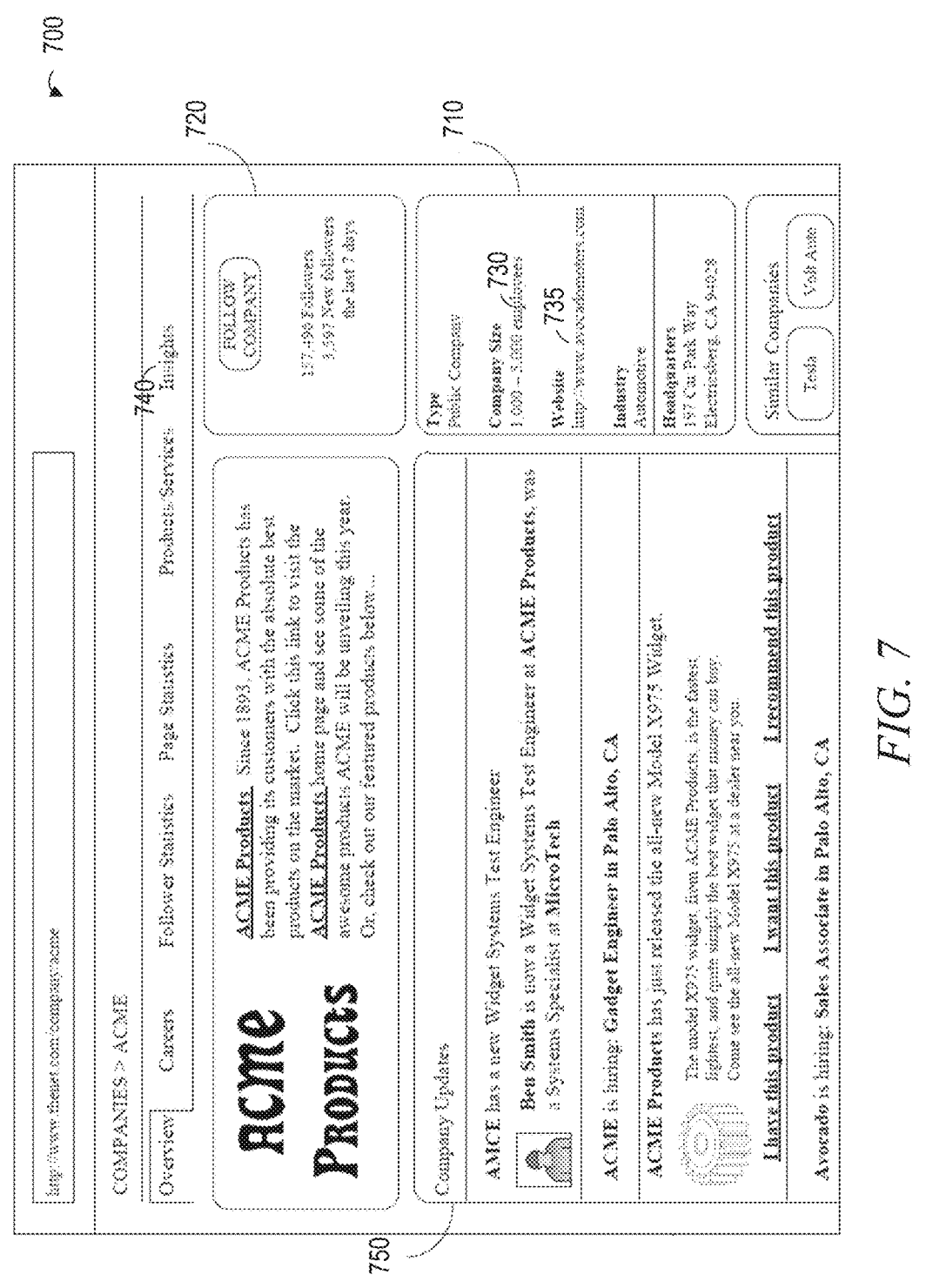

FIG. 7 is a user interface diagram illustrating an example of a company profile (e.g., a company page 700) generated from company information obtained using methods 400, 500, and 600. The company page 700 presents various information about a company, including an activity stream showing various messages or status updates published, on behalf of the company, by authorized representatives of the company, consistent with some embodiments.

As illustrated in FIG. 7, the example company page is for a company with the name ACME Products. In this example, the company page 700 for ACME Products is hosted by the social network system 210. Members of the social network service who may be interested in the company can access the company page 700 for ACME Products to view a variety of information about the company.

For instance, in the example of FIG. 7, the company page 700 for ACME Products presents a brief history and background of the company 710, as well as information about the number of followers 720 (e.g., members who are following the company). The company size 730 and URL 735 of the company can be presented in the background section of the company. As described with respect to FIGS. 2-6, the company page generation module 206 can automatically generate the company page 700 using the methods 300, 400, 500, and 600.

Consistent with some embodiments, the company page 700 may include a navigation bar with a variety of tabs relating to specific topical categories. For instance, in the example of FIG. 7, the company page for ACME Products includes a navigation bar showing tabs for "Overview," "Careers," "Follower Statistics," "Page Statistics," "Products/Services," and "Insights" 740. In some embodiments, selecting a particular tab will cause the content of the page to change, such that content relating to the selected tab is presented. Similarly, the content may be personalized based on the company of the member viewing the content, such that an authorized administrator or representative of the company may view certain information that is not viewable by ordinary members.

In some embodiments, the company page 700 may include a tab associated with content relating to various insights about the company as derived from the member data 218, the third-party sites, or using crowd sourcing techniques. For example, in connection with the "Insights" 740 tab in the example web page of FIG. 7, a viewing member may be presented with information identifying members of the social network service who are employed at ACME Products and who have new job titles, or information about members who have recently departed ACME Products for a new company. In addition, the viewing member may be presented with information, calculated using member data 218, about the number of members of the social network service who are in the viewing member's social graph (e.g., first-degree or direct connections, followers, etc.) and are employed at ACME Products. The company page 700 may present statistical information about the geographical location of residences of the employees of the company. Of course, other insightful information may be presented as well, such as the top companies that employees of ACME Products went to subsequent to departing ACME Products.

Referring again to FIG. 7, various items of content are shown in separate content modules. In the company update 750 portion of the example user interface, the company page presents a user interface for a data feed, generally referred to as an activity stream, content stream, or company updates stream, via which messages or status updates published on behalf of the company are presented.

According to various example embodiments, one or more of the methodologies described herein may facilitate automatic generation of company profile pages. With regards to marketing or other purposes, such company information can be valuable for a sales team to find a company in a specific industry and the members associated with the company. Company information can include age of company, size of company, ownership of company, partnership between different companies, geographic locations (e.g., distribution center, headquarters), market, position, stage, trends, customers, property, parent company, and subsidiaries of a company.

When these effects are considered in aggregate, one or more of the methodologies described herein may obviate a need for certain human efforts or resources that otherwise would be involved in obtaining company information and generating a company profile page. Additionally, the methodologies described herein facilitate efficient marketing, which can increase revenues and sales. Furthermore, computing resources used by one or more machines, databases, or devices (e.g., within the network environment 100) may similarly be reduced (e.g., by pre-determining sites to ingest company information, by automatically triggering the creation of a company page). Examples of such computing resources include processor cycles, network traffic, memory usage, data storage capacity, power consumption, and cooling capacity.

Furthermore, by generating company profiles, the social network system 210 can target advertisements to a member based on the member's association with the company page. The member's association can be based on the industry, member data, member connection, and so on. For example, a member that is an employee of the company with the company page can be targeted for advertisement. In some instances, the advertisement cost in the social network system 210 may be dependent on the number of messages sent, and therefore a marketer may want to specifically tailor the advertisement to a specific industry or members with specific job skills.

Figure 8:
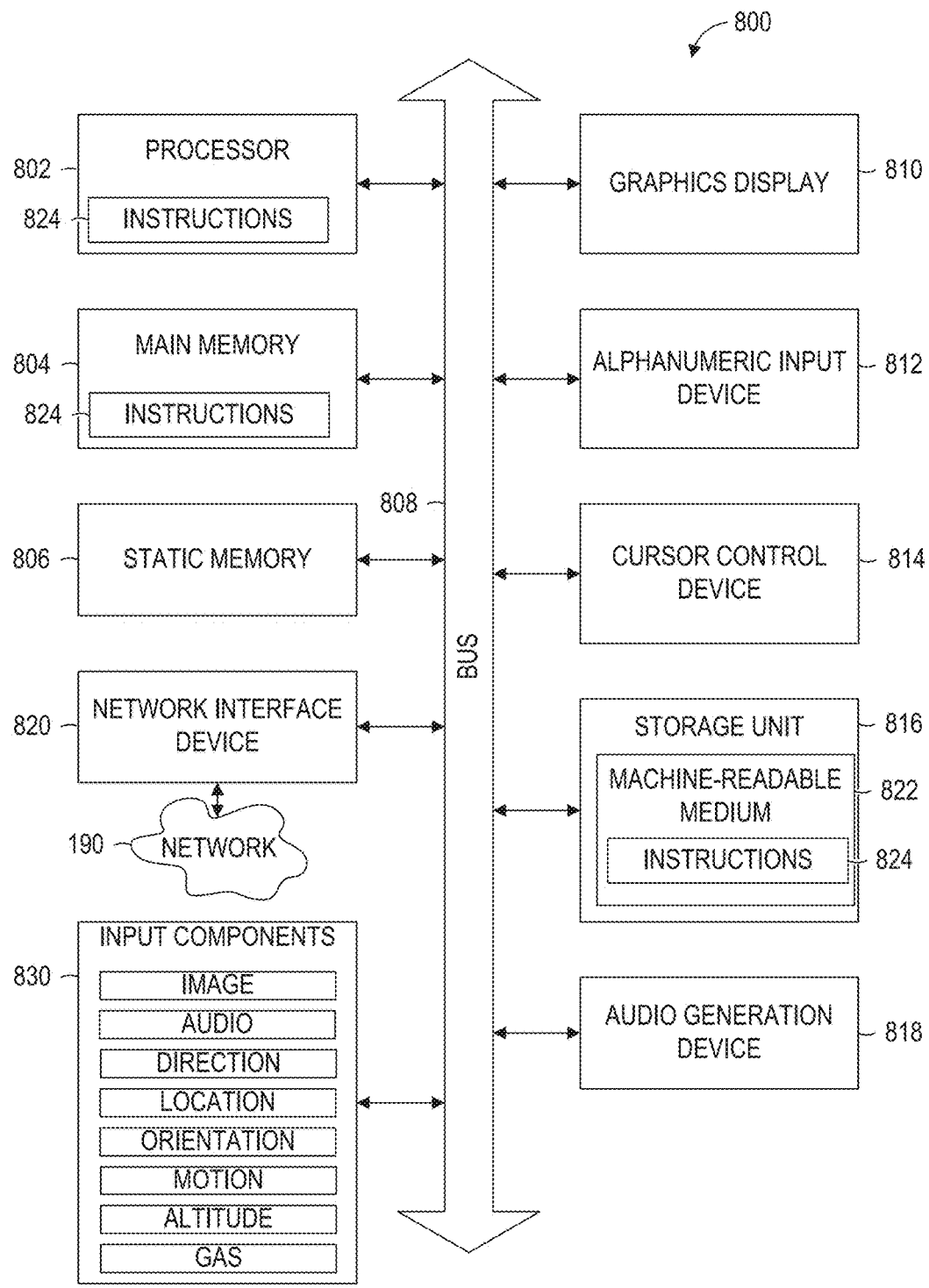
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or another pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media), The instructions 824 may be transmitted or received over the network 190 via the network interface device 820. For example, the network interface device 820 may communicate the instructions 824 using any one or more transfer protocols (e.g., Hypertext Transfer Protocol (HTTP)).

In some example embodiments, the machine 800 may be a portable computing device, such as a smartphone or tablet computer, and may have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component e.g., one or more accelerometers), an altitude detection component e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor, it will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible company, and such a tangible company may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, hut not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
receiving a user input from a first member of an online service, the user input including an employer name, the employer name being similar to but not identical to a company name of a company having a company web page in the online service;
accessing member data of the first member, the member data having social graph information;
calculating, using the social graph information, a first connection density value among the first member and members having profile information matching the employer name; the first connection density value verifying whether the member is connected to other members associated with the employer name;
calculating, using the social graph information, a second connection density value among the first member and members having profile information matching the company name, the second connection density value verifying whether the member is connected to other members associated with the employer;
determining, using a processor, that the employer has an omitted company web page when the first connection density value exceeds a first threshold and when the second connection density value does not exceed a second threshold, the second threshold being set based on a size for the company having the company name, the size based on number of employees; and
initiating a generation of a company web page for the employer based on the determination.

2. The method of claim 1, wherein the first connection density value is calculated by an offline data processing module.

3. The method of claim 1, wherein the determination that the company has the omitted page is further based on a location for the company and a location for the member.

4. The method of claim 3, wherein the employer is determined to have an omitted page when the location for the company is different than the location for the member.

5. The method of claim 1, wherein the determination that the company has the omitted page is further based member activity and behavior data, the member activity and behavior data including profile page views, company web page views, and newsfeed postings.

6. The method of claim 1, further comprising:
searching for companies corresponding to the employer based on different variations of the employer's name, a location of the employer, and an industry of the employer.

7. The method of claim 1, further comprising:
publishing the company web page for the employer in an online social network.

8. The method of claim 7, further comprising:
linking the member with the published company web page for the employer.

9. The method of claim 7, further comprising:
sending a request to the member to be an administrator of the published company web page for the employer.

10. The method of claim 1, wherein the social graph information includes first-degree connections of the member.

11. A non-transitory machine-readable storage medium comprising instructions that, when executed by one or more processors of a machine, cause the machine to perform operations comprising:
receiving a user input from a first member of an online service, the user input including an employer name, the employer name being similar to but not identical to a company name of a company having a company web page in the online service;
accessing member data of the first member, the member data having social graph information;
calculating, using the social graph information, a first connection density value among the first member and members having profile information matching the employer name; the first connection density value verifying whether the member is connected to other members associated with the employer name;
calculating, using the social graph information, a second connection density value among the first member and members having profile information matching the company name, the second connection density value verifying whether the member is connected to other members associated with the employer;
determining, using a processor, that the employer has an omitted company web page when the first connection density value exceeds a first threshold and when the second connection density value does not exceed a second threshold, the second threshold being set based on a size for the company having the company name, the size based on number of employees; and
initiating a generation of a company web page for the employer based on the determination.

12. The storage medium of claim 11, wherein the first connection density value is calculated by an offline data processing module.

13. The storage medium of claim 11, wherein the employer is further determined to have an omitted page when a location for the company is different than a location for the member.

14. A network system comprising:
one or more databases having member profile data, company profile data, and database having social graph data;
one or more processors to:
receive a user input from a first member of an online service, the user input including an employer name, the employer name being similar to but not identical to a company name of a company having a company web page in the online service;
access member data of the first member, the member data having social graph information;
calculate, using the social graph information, a first connection density value among the first member and members having profile information matching the employer name, the first connection density value verifying whether the member is connected to other members associated with the employer name;
calculate, using the social graph information, a second connection density value among the first member and members having profile information matching the company name, the second connection density value verifying whether the member is connected to other members associated with the employer;
determine, using a processor, that the employer has an omitted company web page when the first connection density value exceeds a first threshold and when the second connection density value does not exceed a second threshold, the second threshold being set based on a size for the company having the company name, the size based on number of employees; and initiate a generation of a company web page for the employer based on the determination.

\* \* \* \* \*

UNITED STATES PATENT AND TRADEMARK OFFICE
CERTIFICATE OF CORRECTION

PATENT NO. : 10,467,708 B2
APPLICATION NO. : 15/146344
DATED : November 5, 2019
INVENTOR(S) : Pinkovezky et al.

It is certified that error appears in the above-identified patent and that said Letters Patent is hereby corrected as shown below:

On the Title Page

On page 2, in Column 2, under "Other Publications", Line 1, delete "OFfice" and insert --Office-- therefor In the Claims In Column 21, Line 18, in Claim 1, delete "name;" and insert --name,-- therefor In Column 22, Line 15, in Claim 11, delete "name;" and insert --name,-- therefor Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*